(12) United States Patent  (10) Patent No.: US 7,698,585 B2
Malik et al.  (45) Date of Patent: Apr. 13, 2010

(54) APPARATUS, SYSTEM, AND METHOD FOR REDUCING IDLE POWER IN A POWER SUPPLY

(75) Inventors: Randhir S. Malik, Cary, NC (US); Trung M. Nguyen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 12/170,983

(22) Filed: Jul. 10, 2008

(65) Prior Publication Data

US 2010/0011234 A1    Jan. 14, 2010

(51) Int. Cl.
 *G06F 1/32* (2006.01)
(52) U.S. Cl. .................. 713/320; 713/300; 323/246
(58) Field of Classification Search .......... 713/300, 713/320, 323; 323/246
 See application file for complete search history.

(56) References Cited

U.S. PATENT DOCUMENTS

| | | | |
|---|---|---|---|
| 6,295,217 B1 * | 9/2001 | Yang et al. | ............ 363/49 |
| 6,304,473 B1 | 10/2001 | Telefus et al. | |
| 6,333,862 B1 * | 12/2001 | Lee et al. | ......... 363/21.01 |
| 6,839,247 B1 | 1/2005 | Yang et al. | |
| 6,848,056 B2 * | 1/2005 | Honda et al. | ............ 713/300 |
| 6,960,906 B2 * | 11/2005 | Yamashita | ............ 323/285 |
| 6,986,067 B2 * | 1/2006 | Odaohhara et al. | ........ 713/320 |
| 7,064,968 B2 | 6/2006 | Choi et al. | |
| 7,248,533 B2 | 7/2007 | Aimoto | |
| 7,380,142 B2 * | 5/2008 | Lee et al. | ............ 713/300 |
| 2004/0027099 A1 | 2/2004 | Fujii | |
| 2006/0101294 A1 | 5/2006 | Lee et al. | |
| 2007/0124615 A1 | 5/2007 | Orr | |
| 2007/0211553 A1 | 9/2007 | Tada | |
| 2008/0061758 A1 | 3/2008 | Nishida | |
| 2008/0258703 A1 * | 10/2008 | Makino et al. | ............ 323/355 |
| 2009/0278517 A1 * | 11/2009 | Kleveland | ............ 323/272 |

FOREIGN PATENT DOCUMENTS

| JP | 8205399 | 8/1996 |
|---|---|---|
| JP | 2002-112457 | 4/2002 |

OTHER PUBLICATIONS

Japanese Office Action dated Oct. 8, 2009.
Extended European Search Report dated Jun. 16, 2009.

* cited by examiner

*Primary Examiner*—Chun Cao
(74) *Attorney, Agent, or Firm*—Bruce R. Needham; Shimokaji & Associates, P.C.

(57) ABSTRACT

An apparatus, system, and method is provided for reducing idle power in a power supply. The apparatus includes a connection module to determine whether a load is connected to the output terminal of the power supply. Also included is an idle module that turns off the power supply for an idle interval when the connection module determines that a load is not connected to the output. A monitor module turns on the power supply for a monitor interval when the idle interval ends. During the monitor interval, the connection module determines whether the load has been connected to the output terminal of the power supply. An activation module turns on the power supply if the connection module determines, during the monitor interval, that the load has been connected to the power supply. If the load has not been connected, another idle interval is initiated.

30 Claims, 7 Drawing Sheets

APPARATUS, SYSTEM, AND METHOD FOR REDUCING IDLE POWER IN A POWER SUPPLY

BACKGROUND OF THE INVENTION

1. Field of the Invention

This invention relates to the field of power supplies, and particularly to reducing the idle power consumption in power supplies for adapters and mobile products.

2. Description of the Related Art

Individuals and corporations are becoming increasingly aware of their energy consumption and are actively seeking to reduce it. Whether the primary motivation is to reduce the size of a carbon footprint or save on energy costs, consumers are demanding more energy efficient and eco-friendly products from manufacturers.

In our age of ubiquitous electronic devices, consumers and regulators are becoming increasingly aware of the energy costs of electronics. A common culprit of energy inefficiency is the so-called energy vampire. Common electrical devices, such as computers, televisions, and appliances require standby power and consume electricity even when the device is off. Standby power accounts for the power necessary to allow the device to maintain information even when it is off, respond to remote controls, or provide other functions. It also accounts for parasitic losses in the device. The power consumed in standby mode is comparable to the power consumed in active mode for many devices.

Many devices, such as the laptop computer 110, personal data assistant ("PDA") 112, and cellular phone 114 shown in FIG. 1, plug into a charger such as the charger 100. Many consumers leave the chargers 100 plugged in after they disconnect the device that they were charging. These disconnected chargers 100 continue to consume energy even when they are no longer providing any valuable function. Arguably, these losses in adapters are even worse than those due to standby power consumption since the power is entirely wasted and provides no functional value to the owner.

The EPA estimates that the power consumed by devices that are off or by chargers 100 left plugged in amounts to approximately 45 billion kilowatt-hours of electricity per year and costs upwards of 3.5 billion dollars annually. Given these significant costs, industry is focusing on ways to reduce the power consumed by the electronic devices they manufacture. What is needed is a process, apparatus, and system for reducing the amount of power consumed in a power supply when it is idle; that is, when it is not actively providing power to an electronic load.

BRIEF SUMMARY OF THE INVENTION

The present invention has been developed in response to the present state of the art, and in particular, in response to the problems and needs in the art that have not yet been fully solved by currently available power reduction technologies. Accordingly, the present invention provides a process, apparatus, and system for reducing the idle power in a power supply that overcomes many or all of the above-discussed shortcomings in the art.

The apparatus is provided with a logic unit containing a plurality of modules configured to functionally execute the necessary steps for reducing idle power consumption in a power supply. The apparatus includes, in one embodiment, a connection module to determine whether a load is connected to an output terminal of a power supply.

In one embodiment, the connection module determines whether the load is connected to the output of the power supply by measuring an output power value at the output terminal for the power supply and comparing the output power value with a pre-defined threshold value. In certain embodiments this additionally involves sending the output power value and a reference value defining the pre-defined threshold value to a comparator. The pre-defined threshold value is typically a low value approximately equal to a noise voltage. In other embodiments, the connection module determines whether the load is connected to the power supply by measuring the current drawn through the output terminal of the power supply.

The apparatus also includes an idle module that turns off one or more active components of the power supply for an idle interval in response to the monitor module determining that a load is not connected to the output. At the end of the idle interval, a monitor module turns on one or more active components of the power supply for a monitor interval. The connection module determines whether the load is connected to the output terminal of the power supply during the monitor interval. The connection module may take an instantaneous power measurement, an average power measurement over a monitor interval, or an average power measurement over sub-intervals of the monitor interval.

The apparatus also includes an activation module that turns on the active components of the power supply if the connection module determines during the monitor interval that the load has been connected to the power supply during the monitor interval. In response, the power supply maintains a regulated voltage at the output terminal of the power supply. If the load has not been connected, the power supply enters another idle interval at the conclusion of the monitor interval.

In certain embodiments, the apparatus contains an internal power source for supplying power to the connection module, the monitor module, and the activation module during the idle interval. This internal power source may be a battery or a capacitor that is charged when the power supply is active and on or during a monitor interval in the power save mode. The capacitor is sized in relation to the energy requirements of the modules and also in relation to the length of the idle interval and the monitor interval.

The apparatus may alternatively include a sensor module that measures the output power at the output terminal of the power supply and compares the output power to a pre-defined threshold value. The idle module then turns off the power supply and deactivates sensing by the sensor module for an idle interval if the sensor module determines that the output power is less than the pre-defined threshold value. The monitor module turns on the power supply and activates sensing by the sensor module for a monitor interval at the end of the idle interval. During this monitor interval the sensor module measures output power.

A deactivation module activates the idle module to turn off the power supply and sensing by the sensing module for an idle period when the sensor module measures an output power less than the pre-defined threshold value during the monitor interval. When the sensor module measures an output power greater than the pre-defined threshold value during the monitor interval an activation module returns the power supply to its active state such that the power supply provides a regulated voltage at its output terminal.

In addition to the apparatus described above, a system including such an apparatus is disclosed. The system includes a power supply that receives a regulated electrical input and generates a regulated electrical output. The power supply includes a sensor module, idle module, monitor module, deactivation module, and activation module as described above. The system may also include an electronic device that connects to the output terminal of the power supply. This electronic device may be, for example, a portable computer, an appliance such as a television or washing machine, a phone, or a personal digital assistant. The power supply may be an internal power supply that fits within the electronic device or an external power adapter. The power supply may also be an inverter that receives a DC input and produces an AC output signal at the output terminals.

Further embodiments include a method and a computer program product. The computer program product may include instructions stored in a computer readable medium for reducing idle power in a power supply. The computer program product includes a sensor module, an idle module, a monitor module, a deactivation module, and an activation module as described above. These modules may, in one embodiment, be realized in a microcontroller. The sensing module may determine whether the power supply is providing power by measuring output power at the output terminal of the power supply or measuring the current drawn through the output terminal.

In one embodiment, the idle module turns off the power supply by providing a signal to turn off a pulse width modulator. In addition, the microcontroller may receive power from a capacitor or a battery.

The method for reducing idle power in a power supply includes measuring output power at the output terminal of the power supply and comparing this value to a pre-defined threshold value. The method also includes turning off the power supply for an idle interval if the measured output power is less than the pre-defined threshold value. The method further includes turning on the power supply for a monitor interval and measuring the output power at the output terminal during the monitor interval. The monitor interval beings when the idle interval ends. The method also includes providing a regulated voltage at the output terminals of the power supply when the output power is greater than the predefined threshold value during the monitor interval. The method also includes repeating the steps of turning off the power supply for an idle interval and on for a monitor interval until the output power greater than the threshold value is measured during the monitor interval.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. The disclosed modules may be realized in a microcontroller.

Modules may also be implemented in software stored on computer readable media such as disks, CDs, hard drives, flash drives, and others known to those in the art, for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In such an embodiment, the modules may be implemented as executable code in computer readable media such as CDs, flash, disks, memory, and others known to those of skill in the art.

Figure 1:
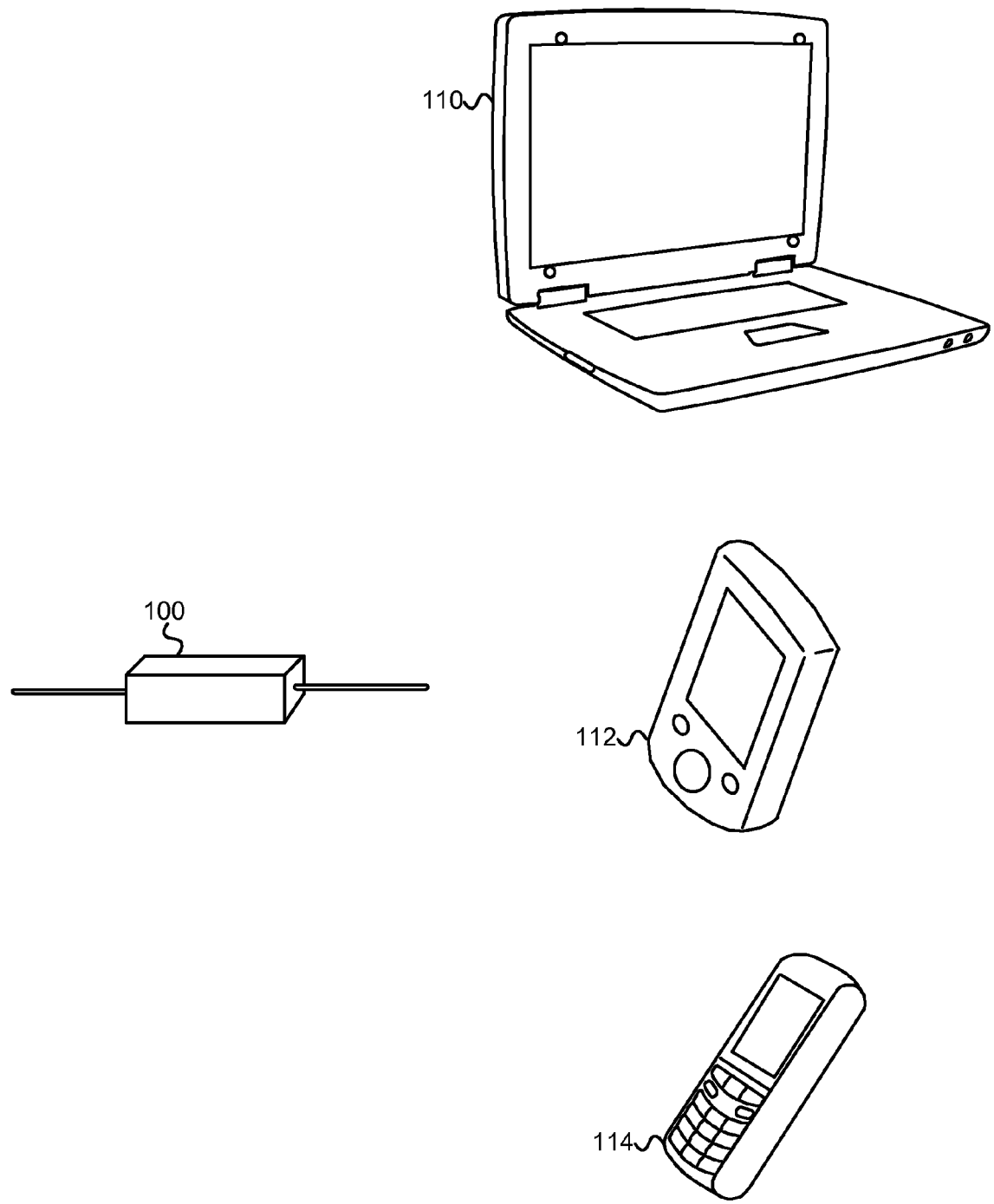
FIG. 1 is a illustrative drawing of various exemplary devices requiring power from a detachable power supply.

As mentioned briefly above, FIG. 1 depicts a laptop computer 110, a PDA 112, and a cell phone 114. These devices are exemplary of a wide range of electronic devices, from battery chargers to MP3 players, where the load is removable from the charging supply such as the power supply 100. Other devices that may include a power supply 100 include appliances (televisions, washers, dryers, etc), blade systems, and desktop computers. In certain embodiments, the power supply 100 may be physically incorporated into the electronic device that constitutes the load. In such an embodiment, the load may not be physically removable from the power supply 100, but it may appear to be much smaller when the device is turned off. In such an embodiment, the load may be considered electrically removed even if it remains physically attached. The present invention may be implemented in a power supply 100 that powers one or more electronic devices that represent a load on the power supply 100 where the load may be either disconnected or reduced to a low value when the electronic device is turned off.

Figure 2:
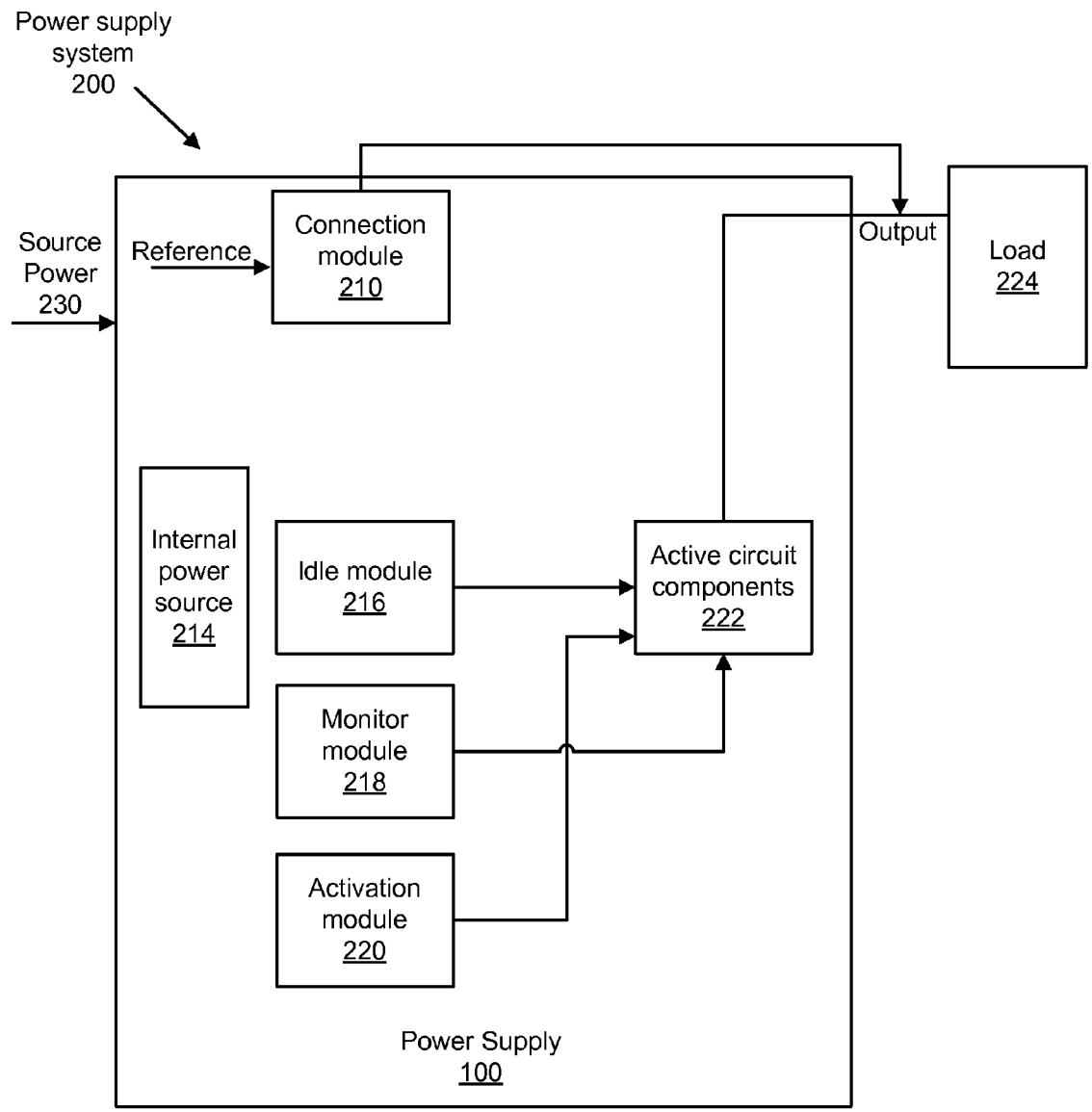
FIG. 2 is a system block diagram showing one embodiment a power supply in accordance with the present invention.

FIG. 2 presents an illustrative block diagram of a power supply system 200. The system 200 includes a power supply 100 and a load 224. The power supply 100 includes a connection module 210, an internal power source 214, an idle module 216, a monitor module 218, an activation module 220, and active circuit components 222. In an alternative embodiment, an apparatus that goes into the power supply 100 includes the connection module 210, internal power source 214, idle module 216, monitor module 218, and activation module 220. The present invention is not limited to only one of the embodiment just mentioned, and description in the specification describing the modules being incorporated directly into the power supply 100 are only illustrative of one manner in which the present invention may be implemented.

The power supply 100 receives a regulated input voltage, identified in FIG. 2 as the source power 230, and produces a regulated output voltage at the output. In one embodiment, the source power 230 is an alternating current (AC) source that provides an input voltage, such as a wall socket. This AC input voltage may be approximately 60 Hz and 120 Volts or have other values typical for power sources in various countries where the device may be implemented.

The power supply 100 converts the input voltage into a regulated output voltage. In one embodiment, the output voltage is a direct current (DC) voltage and provides the power necessary to charge or allow operation of an electronic device such as those shown in FIG. 1. Alternatively, the power supply 100 may be an inverter that receives a regulated input DC voltage and generates a regulated output AC voltage.

The power supply 100 includes active circuit components 222. The active circuit components 222 may be, for example, switches composed of MOSFETs, BJTs, and pulse width modulators, power monitors, comparators, amplifiers, and other components known to those of skill in the art. These active circuit components 222 may be used to create multiple stages in the power supply 100. A multi-stage power supply 100 typically includes multiple stages with various topologies such as boosts, bucks, buck-boosts, flybacks, Ćuks, combinations thereof, and other known topologies that make use of switches. Those in the art will appreciate that such multi-stage supplies can be used to provide active power factor correction by controlling the input current of the load so that it is proportional to the input voltage. In this manner, active power factor correction can provide a power factor close to unity, thus reducing energy losses and harmonics in the system. Power supply stages using active circuit components 222 can also be configured to provide a tightly regulated output voltage for the power supply 100 in spite of changes to the load.

The process of providing and maintaining such a tightly regulated output voltage for the power supply 100 imposes a cost on the system. Thus, energy is required to maintain the output voltage regardless of whether or not the load is attached to the output terminal. For example, in typical embodiments, the active circuit components 200 include switches. Operating these switches incurs switching losses in the power supply 100.

In the depicted embodiment, the power supply 100 includes a connection module 210. The connection module 210 determines whether a load (such as an electronic device) is connected to an output terminal of the power supply 100. In one embodiment, the connection module 210 determines whether a load is present through a mechanical-electrical connection sensor. For example, the connection module 210 may include a pin that shorts when the load is connected to the power supply 100, thus signaling the presence of the load.

In an alternative embodiment, the connection module 210 may detect the presence of the absence of a load by measuring electrical parameters of the circuit such as the output power value at the output terminals of the power supply 100. The connection module 210 then compares this measured output power value with a pre-defined threshold value and, based on the comparison, makes a decision as to whether or not the load is connected to the power supply 100.

In one embodiment, the connection module 210 includes a comparator that receives as its inputs the measured output power value and the pre-defined threshold value. When the output power value is equal to, or less than, the pre-defined threshold value, the comparator provides a signal indicating that the load is disconnected. The pre-defined threshold value is ideally a low value that is close to zero, but sufficiently high to prevent false triggers. For example, it is feasible that noise causes the connection module 210 to measure a power value, or at least signal a power value at the output terminal that is greater than zero watts even when no load is connected to the power supply 100. An appropriate pre-defined threshold value helps to ensure that noise and other unexpected fluctuations do not cause the connection module 210 to falsely report the presence of a load.

Alternatively, the connection module 210 determines whether a load is attached to the output terminal of the power supply 100 by measuring the current drawn through the output terminal of the power supply 100. In one embodiment, the connection module 210 measures electrical current using a resistor. Other devices, including Hall effect devices and current transformers, known to those of skill the art could alternatively be used to measure current.

The power supply 100 also includes an idle module 216. The idle module 216 turns off the active components of the power supply 100 for an interval of time referred to herein as an idle interval when the connection module 210 determines that a load is not connected to the output terminals of the power supply 100. In one embodiment, the idle module 216 also deactivates the connection module 210 for the idle interval such that the connection module 210 does snoop or look for the load during the idle interval. Thus, if the load is connected to the power supply 100 during the idle interval, the connection module 210 does not detect or does not report the presence of the load.

Alternatively, the idle module 216 turns off everything but the monitoring function provided by the connection module 210. In one embodiment, turning off the active components of the power supply 100 involves turning off logic, sensors, or communication components in the power supply 100. The idle module 216 may actually turn off the active components 222 or, in an alternative embodiment, generate a signal to turn off active components 222 such as a pulse width modulator.

Turning off the active circuit components 222 for the idle interval typically causes the power supply 100 to stop generating a regulated voltage at the output terminals. It also significantly reduces the energy consumed by the power supply 100 during the idle interval.

The power supply 100 further comprises a monitor module 218 that turns on the active components 222 for a monitor interval when the idle interval is over. In one embodiment, the monitor module 218 turns these active components 222 on for the entire monitor interval even when readings by the connection module 210 during the monitor interval indicate that the load is not present. In one embodiment, regardless of whether or not the load is present, the active circuit components 222 are on for the entire monitor interval. Turning on the active components 222 may including turning on, directly or through a signal, logic, sensors, or components such as pulse width modulators.

During the monitor interval, the connection module 210 of the power supply 100 monitors the output power at the output terminal and determines whether the load is connected to the power supply 100. If there is no load during the monitor interval, the monitor interval continues until its end. If the load is connected during the monitor interval, or if the load is connected during the idle interval prior to the monitor interval, the connection module 212 reports the presence of the load.

The connection module 210 may measure the output power at the output to determine whether or not the load is present, as discussed above. The connection module 210 may do so during the monitor interval using a variety of different approaches. In one approach, the connection module 210 takes an instantaneous power measurement, or a substantially instantaneous power measurement during the monitor interval. Alternatively, the connection module 210 averages the power readings over the entire monitor interval and compares this average value with the pre-defined threshold value. The connection module 210 may also take average power measurements over one or more subintervals of the monitor interval, and compare each average power measurement with the pre-defined threshold value.

The power supply 100 also includes an activation module 220. The activation module 220 turns on the active circuit components 222 when the connection module 210 determines during the monitor interval that the load is connected to the power supply 100. When the activation module 220 is triggered, the power supply 100 goes back into its normal operation and provides a regulated voltage at the output terminal of the power supply 100. At this point, the power supply 100 resumes its normal operation and supplies the necessary energy to the attached load.

If, during the monitor interval, the connection module 210 does not detect the load, the idle monitor 216 turns off the active circuit components 222 for an additional idle interval. So long as the load is not connected to the power supply 100, the idle interval-monitor interval cycle continues indefinitely. When the load is connected, the connection module 210 detects its presence during the relevant monitor interval, triggers the activation module 220, and restores the power supply 100 to its standard operation so that it provides a regulated voltage at its output terminals.

In certain embodiments, the power supply 100 may additionally include an internal power source 214. The internal power source 214 powers modules such as the connection module 210, monitor module 218, and the activation module 220 during the idle interval. The internal power source 214 may be a lithium battery or other battery that easily fits within the power supply 100 casing and can provide the necessary power.

The internal power source 214 may also be a capacitor that is charged when the power supply 100 is turned on and is providing a regulated voltage at the output. The capacitor may also be charged when the power supply 100 is in a monitor interval during a power save mode. In such an embodiment, the capacitor is sized to the length of the idle interval such that the capacitor maintains sufficient energy to power the various modules for the entire duration of the idle interval. Similarly, the capacitor is sized to the length of the monitor interval such that the capacitor is charged with sufficient energy during the monitor interval to power the modules for at least the duration of the idle interval.

Those of skill in the art will appreciate that other variations may be used to implement the internal power source 214 and that the internal power source 214 is not limited to a particular implementation. For example, an inductor is an energy storage device that can be used to store and provide energy for the relevant modules as described above.

Figure 3:
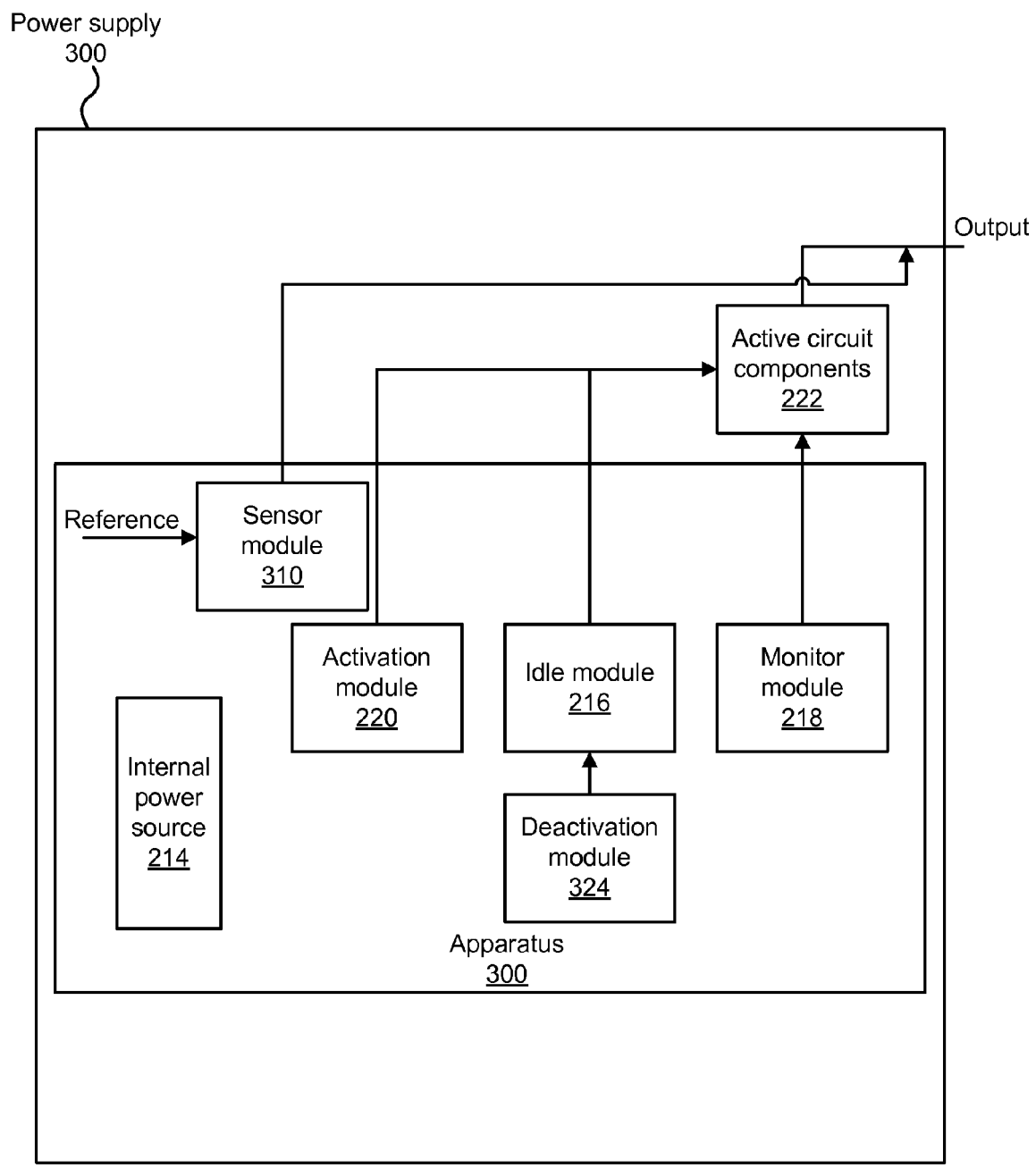
FIG. 3 is an alternative system block diagram showing one embodiment of a power supply in accordance with the present invention.

FIG. 3 shows an alternate embodiment of an apparatus 300 for reducing idle power in a power supply 100. The apparatus 300 includes a sensor module 310, an internal power source 214, activation module 220, idle module 316, monitor module 218, and deactivation module 224, which are described below.

The active circuit components 222 and the internal power source 214 of the power supply 100 are as described above in relation to FIG. 2. The apparatus 300 includes a sensor module 310 that measures the output power at the output terminal of the power supply 100 and compares the output power to a pre-defined threshold value identified as "Reference" in FIG. 3. As discussed above, the sensor module 310 may sense and compare an instantaneous power reading or an average power over a defined time interval. The reference value is typically a low value sufficient to prevent false power readings due to noise.

In the depicted embodiment, the idle module 216 turns off the power supply 100 and deactivates sensing by the sensor module 310 for a period of time referred to as an idle interval. The idle module 316 performs this function when the sensor module 310 determines that the output power is less than the pre-defined threshold value. In one embodiment, turning off the power supply 100 means deactivating the active circuit components 222. Since the output power will typically drop to a near zero value when the load is disconnected, the sensor module 310 effectively senses, by measuring the output power, when the load is disconnected from the power supply 100.

When the sensor module 310 is deactivated during the idle interval, the sensor module 310 stops sending control signals or indicators to other modules indicating that the output power value has dropped below the pre-defined threshold value. In another embodiment, the modules no longer respond to such signals from the sensor module 310 during the idle interval. As a result, during the idle interval, if a load is connected to the output terminal of the power supply 100, the power supply 100 in power save mode does not recognize the presence of the load.

The monitor module 218 turns on the power supply 100 and activates sensing by the sensor module 310 for a monitor interval once the idle interval initiated by the idle module is complete. During this monitor interval, the sensor module 310 actively monitors the output power and sends appropriate signals indicating the presence or absence of a load based on the comparison of the output power and the pre-defined threshold voltage. As a result, a load attached during the idle interval is subsequently detected during the next monitor interval. The timing of the present invention is described in greater detail in connection with FIG. 4.

The apparatus 300 further comprises a deactivation module 224. The deactivation module 224 activates the idle module 216 to turn off the power supply 100 and the sensing by the sensor module 310 for an idle interval if the sensor module 310, by the end of the monitor interval, measures output power that is less than the pre-defined threshold value. In one embodiment, the output power is the average power value over the entire monitor interval. If, by the end of the monitor interval, a load has not been attached and detected by the sensor module 310, the deactivation module 224 cycles the power supply 100 through another idle interval. The deactivation module 224, in conjunction with the idle module 316 and the monitor module 218, places the power supply 100 in an idle interval-monitor interval loop which continues until a load is detected during a monitor interval. This loop is the power save mode of the power supply 100.

The apparatus 300 also includes an activation module 220. The activation module 220 returns the power supply 100 to an active state if the sensor module 310 measures an output power greater than the pre-defined threshold value during the monitor interval. In this active state, the power supply 100 provides a regulated voltage at the output terminal for the load. The activation module 220 may turn on the power supply 100 by activating sensors, logic, communications, and other components and features known to those of skill in the art.

Figure 4A:
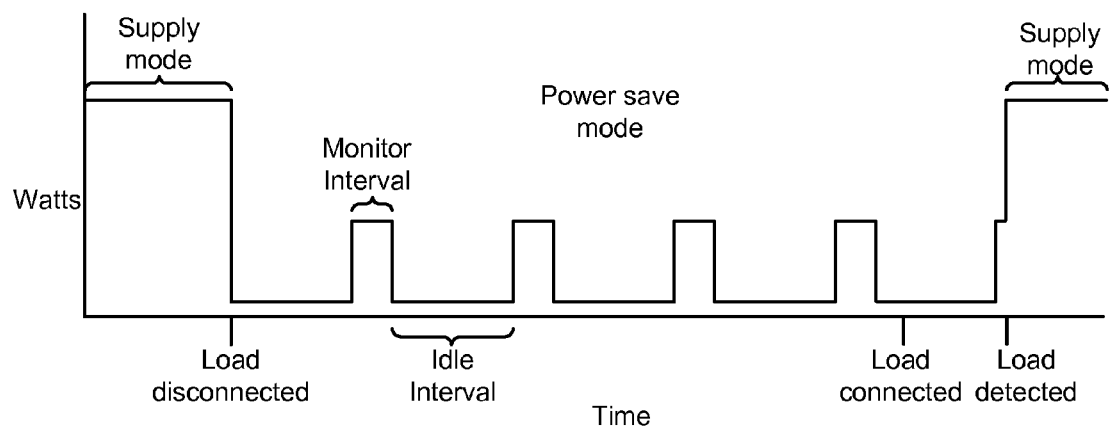
FIG. 4A is an illustrative timing diagram showing one embodiment of the timing of a device implementing the present invention.

FIG. 4A shows a representative timing diagram for an apparatus such as the power supply 100 or apparatus 300 implementing the present invention. During the supply mode stage, a power supply such as the power supply 100 or 300 provides a regulated voltage at the output while the load is connected. In the supply mode stage the power supply 100 generally consumes a certain average power measured in watts. This average power may reflect the parasitic power losses in the power supply 100 along with the power necessary to operate active circuit components such as pulse-modulated switches.

When a user disconnects the load, the power supply 100 transitions to a power save mode where it no longer maintains a regulated voltage at the output terminal. In one embodiment, the power supply 100 transitions to the power save mode when the sensor module 310 determines that the load has been disconnected. In another embodiment, a power supply 100 may transition to the power save mode when a connection module 210 determines that the load has been disconnected.

The power save mode is the sum of a series of idle intervals and monitor intervals initiated by the idle module 216 and the monitor module 318. During the idle intervals, the power supply 100 is turned off, which in certain embodiments involves turning off the pulse-width modulated switches. In one embodiment, the idle module 216 turns off the power supply 100. When the power supply 100 is turned off, the watts used during that interval drops from the watts used by the power supply 100 when it is in supply mode. The length of time of the idle interval is pre-determined by a designer of the power supply 100. In one embodiment, the idle interval may be approximately one minute long.

After the end of the idle interval, the power supply 100 is turned back on for a monitor interval by the monitor module 218. In one embodiment, the pulse-modulated switches are turned back on for the monitor interval along with components for detecting the presence of a load, such as the connection module 210 or the sensor module 310. The relevant components of the power supply 100, such as the sensor module 310, monitor for a load during the monitor interval.

Since the power supply 100 has been turned back on, the average power consumed over the monitor interval is greater than that consumed during the idle interval. The average power consumed during the monitor interval may be substantially equal to the average power consumed when the power supply 100 is in supply mode. In certain embodiments, the average power consumed during the monitor interval may be less. Those of skill in the art will appreciate that the power values shown in FIG. 4A are illustrative and may not be to scale.

As shown in FIG. 4A, if the load is not detected during the monitor interval, the power supply 100 enters an additional idle interval. After this idle interval is complete, a second monitor interval is triggered. This cycle continues until the power supply 100 determines during one of the monitor intervals that the load is connected.

Thus, in the example of FIG. 4A, the load is connected during an idle interval. During this idle interval, the connection sensing functionality of the power supply 100 is disabled such that it does not detect the presence of the load at the time it was connected. At the end of the idle interval, the monitor interval begins. As discussed above, the components for sensing the presence of the load may be configured such that they detect the attachment of the load instantaneously, over a sub-interval of the monitor interval (as shown), or over the entire monitor interval.

Figure 4B:
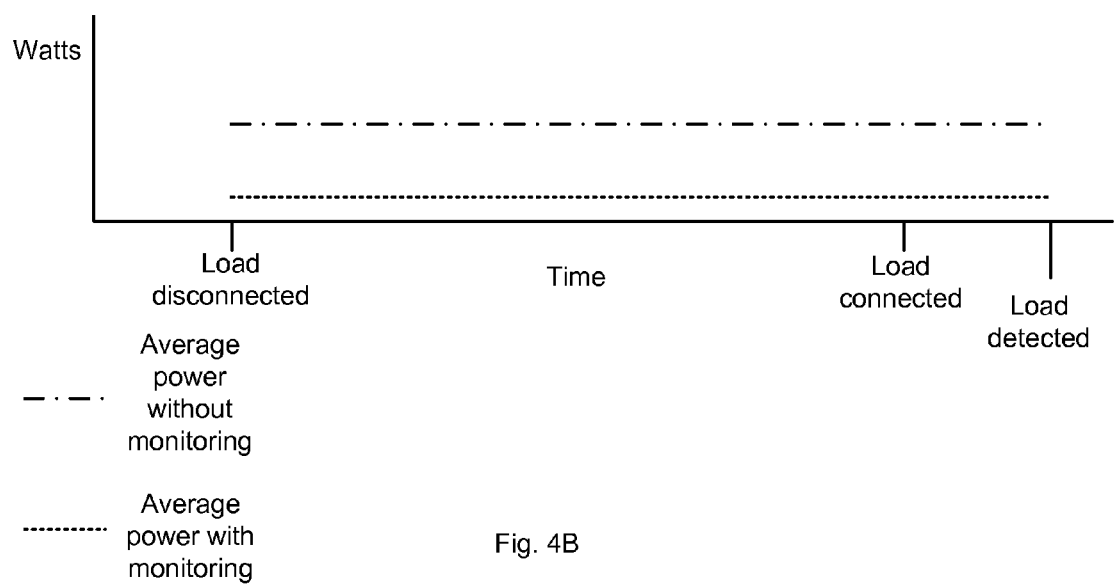
FIG. 4B is an illustrative diagram showing the average power consumed by a device implementing the present invention when it is disconnected from a load.

Once the power supply 100 determines that a load is present, the power supply 100 goes back to supply mode and begins to supply a regulated voltage at the output terminals. As shown in FIG. 4B, during the power save mode, the average power consumed by a power supply 100 without the monitoring and shut-down functionality described herein consumes an average power significantly larger than the average power consumed by a power supply 100 implementing the present invention. In typical embodiments, the idle power is reduced from the order of watts to milliwatts. Such savings, when considered across the entire product line of electronic devices, add up to a significant amount.

Figure 5:
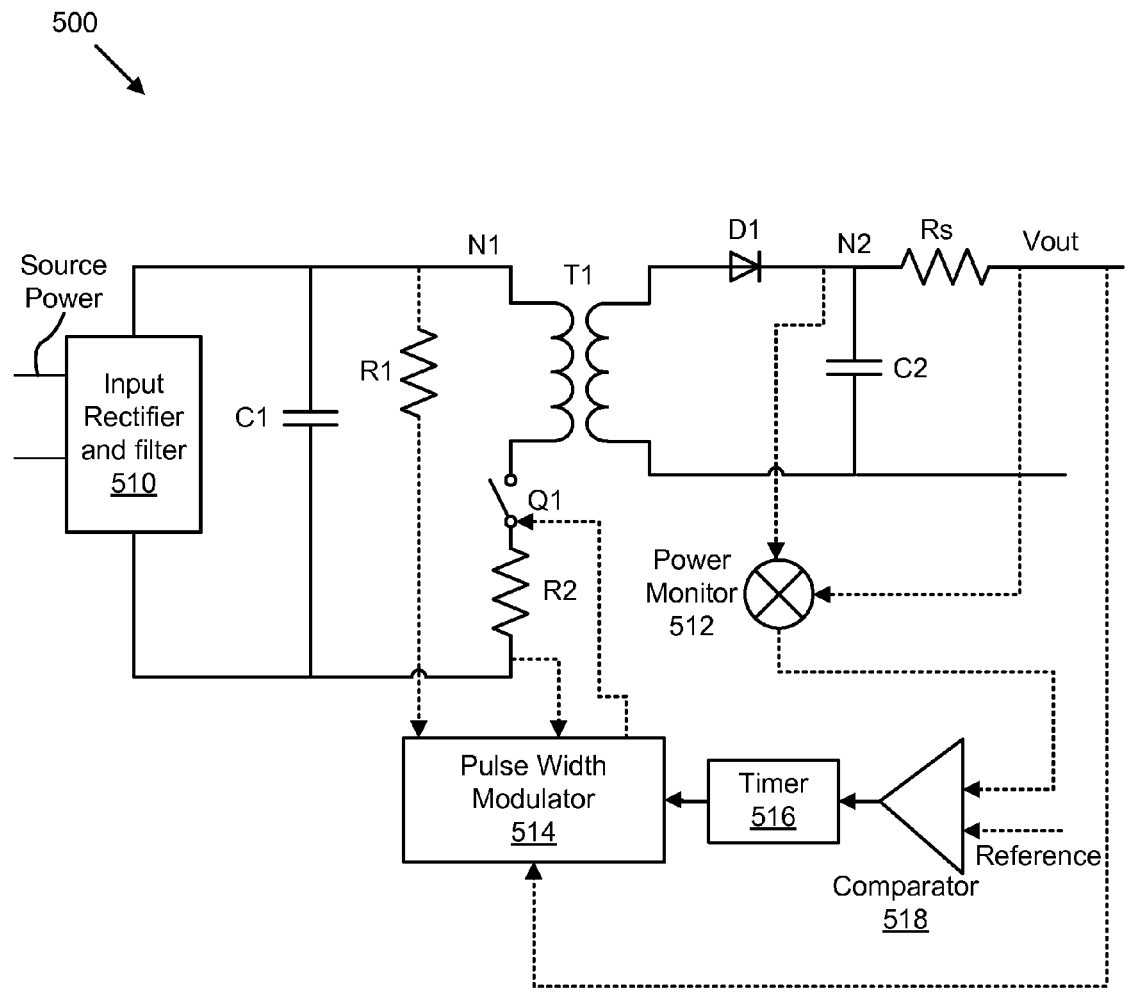
FIG. 5 is an illustrative circuit diagram showing one embodiment of a circuit for implementing the present invention.

FIG. 5 is an illustrative circuit diagram of an exemplary circuit 500 implementing the present invention. The topology of circuit 500 is for a flyback adapter that may be used to provide power to laptops or mobile products. The circuit 500 includes an input rectifier and filter 510. An input voltage is generally first put through the input rectifier and filter 510, which converts the input voltage from AC at its input to DC at its output. The input rectifier and filter 510 may comprise, for example, a half-wave or full-wave rectifier, the output of which is well-known to those in the art. The input rectifier and filter 320 also provides electromagnetic interference ("EMI") filtering in order to meet industry standards. Means for providing such filtering are well-known to those of skill in the art.

The rectified DC voltage generated by the input rectifier and filter 510 is applied to the transformer TI. The transformer TI transforms the chopped DC signal to the secondary side. This signal is then rectified by the diode D1 and filtered by the capacitor C2 before being applied to the load which would attach at Vout. The switching power supply configuration shown provides a tightly regulated output at Vout, and may provide further functionality such as active power factor correction.

A power factor approximately equal to one is highly desirable, and in many cases, required by regulations. The configuration shown draws a current from a source approximately in phase with the input voltage to the boost stage, providing a power factor approximately equal to 1, which furthers the power savings and efficiency of the power supply.

The resistor R1 is used to power the pulse width modulator 514. In one embodiment, the resistor R2 is used to provide the pulse width modulator 514 with a current measurement as part of the feedback necessary for the pulse width modulator 514 to maintain a regulated voltage output. The pulse width modulator 514 also receives feedback concerning the voltage at Vout. Those of skill in the art will appreciate that variations of this may be implemented; for example, a current sensor may be used in place of resistor R2 to determine the current.

The pulse-width modulator 514 drives a switch Q1. The switch Q1 may be a semiconductor device such as metal-oxide field effect transistors (MOSFETs) and bipolar junction transistors (BJTs). Typical embodiments use power MOSFETs for the switches because of their high commutation speed and high efficiency at low voltages; however, a circuit may make use of other switching devices. As is known to those of skill in the art, the switches can be turned on (closed) and off (open) by changing the voltage at the MOSFET terminals. The switch Q1 is an example of an active component 222.

The pulse width modulator 514 controls the switching rate of Q1 and uses a duty cycle value between 0 and 1 to specify a portion of the switching period in which the switch Q1 is in on. The voltages at N1 and at Vout are controlled by changing the duty cycle value and/or the switching period used by the pulse width modulator 514. In one embodiment, the pulse width modulator 514 sends the signal to a driver (not shown) which converts the signal to one that is compatible with the particular switch receiving the signal.

In a typical power supply implemented with a circuit 500 or a related topology, the pulse width modulator 514 continues to regulate the output voltage at Vout regardless of whether or not the power supply is connected to a load. The result is power wasted to operate the pulse width modulator 514 when it is not needed, switching losses, and losses in the house keeping circuitry. These losses are typically on the order of a few watts.

FIG. 5 illustrates an approach to reduce these losses as described above.

FIG. 5 illustrates a power monitor 512 connected to a node N2 and at the point Vout. Those of skill in the art will appreciate that power in an electrical system is equal to the current multiplied by the voltage. In one embodiment, the power monitor 512 takes a voltage value across the capacitor C2 by measuring voltage at N2 and a current value across Rs measured at Vout. When the load is attached to Vout, current will flow across Rs and into the load and a non-zero voltage will appear at N2. In one embodiment, when the load is disconnected from Vout, an open circuit separates Rs and ground and no current flows through Rs. Thus, the power reading will be approximately equal to zero, with noise potentially causing some non-zero fluctuations in the power readings. Those of skill in the art will appreciate that a variety of approaches can be taken to measure voltage and current values at Vout, and that the resistor Rs may not be necessary in certain embodiments.

In other embodiments, the load may not be physically disconnected, but the load value drops below a particular threshold when the electronic device constituting the load is turned off. In such an embodiment, the load may continue to draw current, but the current value changes sufficiently in response to the change in load value that an apparatus 300 can determine that the electronic device is turned off based on the power measurement.

Those of skill in the art will appreciate that FIG. 5 does not measure output power precisely; for example, in operation, the voltage at the point Vout will be somewhat lower than the voltage measured at N2 since some voltage is dropped across the resistor Rs. Thus, in the depicted embodiment, the power monitor 512 may report an output power value that is higher than the actual output power. For purposes of the present invention, output power may refer either to an exact or an approximate output power measured with sufficient precision to determine, based upon the output power reading, whether or not a load is attached.

In other embodiments, the presence of the load may be detected by simply monitoring a current value over an interval at Vout. The presence of the load may also be detected by implementing a mechanical means for detecting when a load is attached or detached. Those of skill in the art will appreciate that a variety of electrical and mechanical methods can be used to determine the presence or absence of the load.

In one embodiment, the power monitor 512 can be used to determine whether or not a load is connected to the power supply. The power monitor 512 monitors power and reports the value to the comparator 518. The power monitor 512 may report the power readings instantaneously or averages over specified time intervals.

The comparator 518 compares the output power reported by the power monitor 512 with a reference value. In one embodiment, the reference value may be tied directly to ground such that the reference value acts as a zero value. In other embodiments, the pre-defined threshold value represented by reference may be some low but non-zero value such that the possibility of a false power value which would indicate the presence of a load is reduced since the measurement is made just above noise level.

The comparator 518 activates the ON/OFF timer 516 when the output power falls below the pre-defined threshold reference value. The On/Off timer 516, in response, turns off the pulse width modulator 514 for an idle interval. During the idle interval, the switch Q1 is no longer actively switching. In one embodiment, the switch Q1 is left in an "open" state such that the switch Q1 appears as an open in the circuit. As such, during the idle interval, the power usage in the circuit 500 drops notably from the power used when the switch Q1 and pulse width modulator 514 are active.

Power readings from the power monitor 512 during the idle interval may be larger than the pre-defined threshold voltage and thus sufficient to trigger a signal from the comparator 518 to the timer 516. The power reading may result in the signal provided by the comparator 518 to the timer 516 going from low to high. For example, the load may be connected to Vout while the capacitor C2 still has a large reserve of energy stored. As a result, the load will draw the voltage stored across C2 over the resistor Rs and generate a non-zero power reading until the capacitor C2 is completely discharged. In one embodiment, the timer 516 ignores these signals from the comparator 518 during the idle interval. In an alternative embodiment, the timer 516 may transition the pulse width modulator 514 to an active on state in response to such a signal during the idle interval. In yet other embodiments, the power monitor 512 or the comparator 518 is deactivated during the idle interval such that the timer 516 does not receive any signal from the comparator 518.

In one embodiment, the power monitor 512 and the comparator 518 are part of the sensor module 310. In one embodiment, the idle module 216, monitor module 318, activation module 220, and deactivation module 224 are realized in the timer 516. In such an embodiment, the timer 516 may be a microcontroller.

After the idle interval, the pulse width modulator 514 turns on for a monitor interval, during which time the circuit 500 resumes active monitoring for a load at Vout. If a load is not detected during the monitor interval, the timer 516 turns the pulse width modulator 514 off for an additional idle interval. In one embodiment, the timer 516 continues to alternate the pulse width modulator between the off and active states for idle and monitor intervals respectively until the timer 516 receives, during a monitor interval, a signal from the comparator 518 indicating that the load is attached. This signal may take the form of a transition of the output signal provided by the comparator 518 from low to high, which transition is occasioned by the power monitor 512 reading an output power value greater than the pre-defined threshold value and the comparator 518 detecting that change.

As discussed in greater detail above, the comparator 518 may transition the signal sent to the timer 516 in response to an instantaneous change read by the power monitor 512. The comparator 518 may also average the values provided by the power monitor 512 over some interval equal to or less than the monitor interval. Those of skill in the art will appreciate that the measurement intervals may alternatively be incorporated into the power monitor 512.

Figure 6:
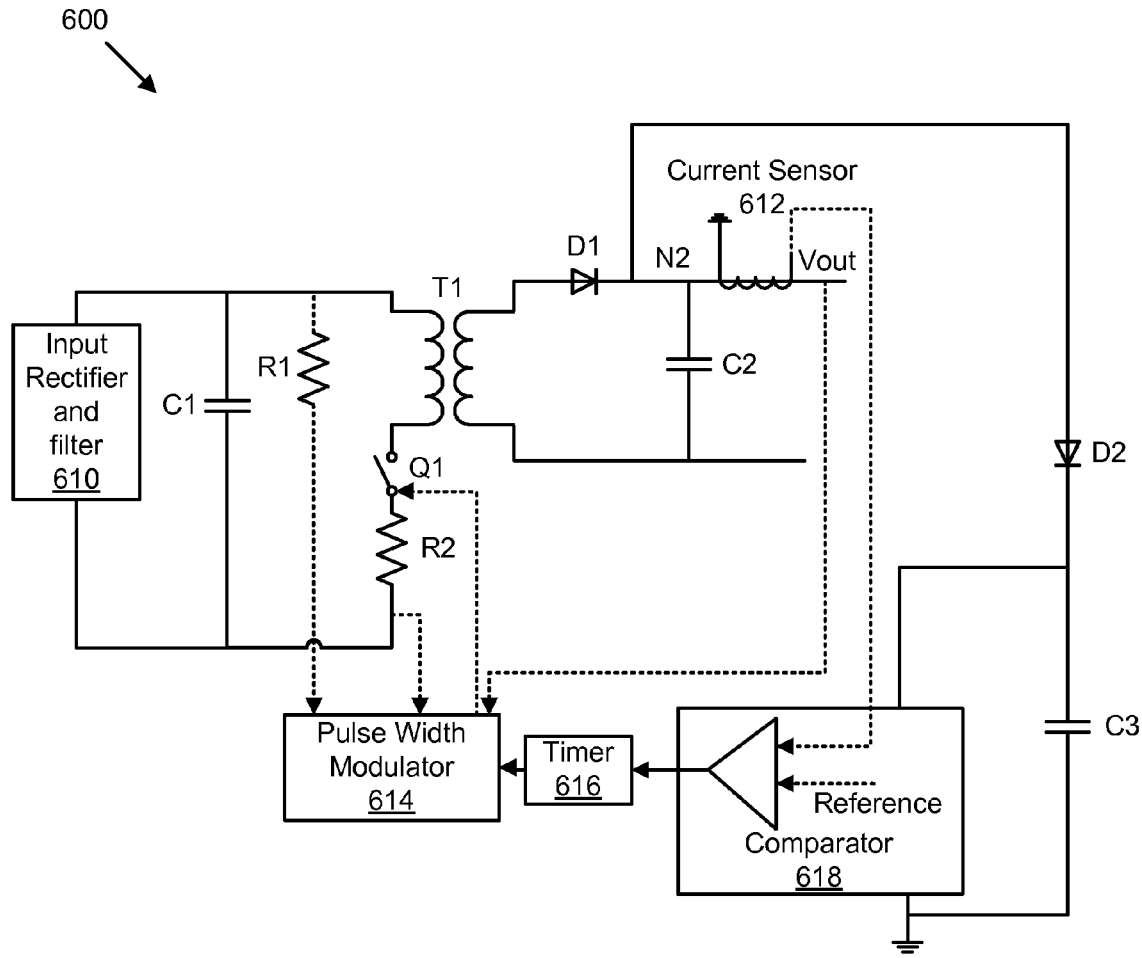
FIG. 6 is a second illustrative circuit diagram showing an embodiment of a circuit for implementing the present invention.

FIG. 6 illustrates a circuit 600 similar to that shown in FIG. 5, but with the addition of an internal power source and a different device for detecting the presence or absence of a load. The circuit 600 may be configured to provide idle intervals and monitor intervals as discussed in connection with FIG. 5, and additionally shows an embodiment for powering components of the circuit 600 during the idle intervals.

As shown, the circuit 600 does not have a power monitor, and instead includes a current sensor 612 at Vout. In one embodiment, the current sensor 612 is a current transformer. In an alternative embodiment, the current sensor 612 is a Hall effect sensor or other current detection device known to those of skill in the art. When the power supply is in its on state and in supply mode such that it provides a regulated voltage at Vout, a load attached to the output terminals will draw a current through the output terminal such that the current sensor 612 reads a non-zero current value. When the load is disconnected, the output terminal of the power supply is an open circuit such that no current is measured by the hanging current sensor 612.

In the depicted embodiment, the current sensor 612 can be used, in conjunction with the comparator 618, to determine based on the current measurements whether or not a load is connected to the power supply. The operations of this circuit 600 are similar to those of circuit 500, in that the value measured by the current sensor 612 is compared to a pre-defined threshold value represented in FIG. 6 as "Reference." Based on this comparison, the circuit 600 can determine whether or not a load is attached to the power supply.

FIG. 600 shows a diode D2 and a capacitor C3 in addition to the elements shown in FIG. 5. Those of skill in the art will appreciate that the diode D2 prevents current from leaking out of the capacitor C3 and across Rs. Thus, for example, if a load were attached to Vout during the idle interval, the diode D2 prevents the energy stored in C3 from discharging over Rs and the load.

As a result, the capacitor C3 may be used to provide power for components such as the power monitor 612, comparator 618, and timer 616. As illustrated, the capacitor C3 provides power to the comparator 618. The power supply in active mode, with the pulse width modulator 614 actively switching Q1 and the power supply providing a regulated voltage at Vout, provides the energy stored in the capacitor C3 as part of normal operation. However, when the power supply is turned off during the idle interval, capacitor C3 is no longer energized by the active functioning of the power supply.

During the idle interval, the capacitor C3 provides energy to power the components of the power supply. For example, during the idle interval the capacitor C3 provides power to the comparator 618. The capacitor C3 must be of sufficient size to store the energy necessary to provide the comparator 618 with power for the entire idle interval. Those of skill in the art are capable of sizing the capacitor C3 appropriately based on the energy requirements of the components that it powers, and based on the length of the idle interval as well.

After the idle interval, the capacitor C3 will naturally have expended some or all of its energy in powering components of the power supply. If, immediately following the idle interval a load is detected, the power supply is transitioned to the active on state and the capacitor C3 is energized by the normal operations of the power supply. If, however, the power supply is not turned on during the monitor interval, the monitor interval itself must be of sufficient length to re-energize the capacitor C3. Again, those of skill in the art are capable of determining, based on the size of the capacitor and its energy state at the end of the idle interval, how long the monitor interval should be in order to provide the capacitor C3 with sufficient energy for the next idle interval.

The capacitor C3 may be used to power multiple components in the power supply. In one embodiment, the capacitor C3 does not provide power to the power monitor 612 during the idle interval. Power for the power monitor 612 may not be necessary during the idle interval if no monitoring is required during that time period. The capacitor C3 may, in certain embodiments, be used to power the timer 616 and to "bootstrap" the pulse width modulator 614, providing sufficient power to restart the switching operation after the end of the idle interval but before the circuit 600 begins providing power for the pulse width modulator 614.

Figure 7:
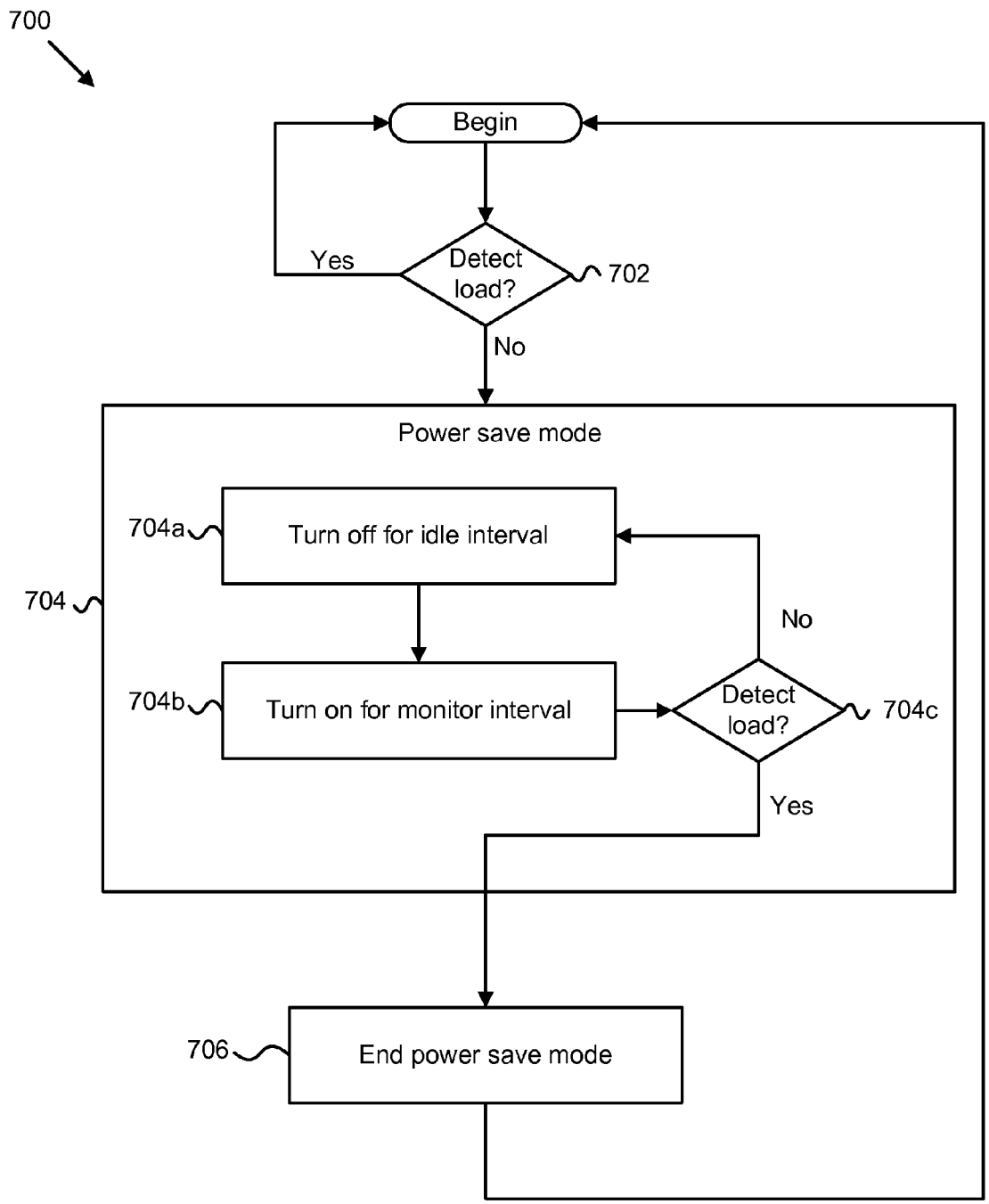
FIG. 7 is a schematic flow chart diagram illustrating the one embodiment of a method for implementing the present invention.

FIG. 7 illustrates a flow chart depicting an example of operation of the present invention. Those of skill in the art will appreciate that the steps disclosed in FIG. 7 may be reordered, omitted, or expanded without departing from the spirit of the present invention, and that the present invention is not limited only to the method shown.

The method 700 begins with detecting 702 the presence or absence of a load connected to the power supply. If the load is present, the detecting 702 step repeats. At this point, the power supply provides a regulated voltage output for the load connected to its output terminals. Operation of the power supply thus corresponds to the supply mode described in connection with FIG. 4A. If the load is missing or disconnected, the power supply transitions to a power save mode 704.

In power save mode 704, the power supply is turned off 704a for an idle interval. When the idle interval concludes, the power supply is turned on 704b for a monitor interval and at the same time begins monitoring 704c for a load. If, at the end of the monitor interval, the load has not been connected, the power supply determines 704c that that load is absent and the power supply is turned off for a subsequent idle interval. The power supply remains in power supply mode 704 and repeats the idle interval-monitor interval pattern until a load is detected during the monitor interval.

If the power supply determines 704c, that a load is connected, the power supply ends 706 power save mode and begins to once again provide a regulated output voltage at the output terminal. The monitoring and detection step 702 then begins until the load is once again disconnected from the power supply.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reducing idle power in a power supply, the apparatus comprising:
a connection module that determines whether a load is connected to an output terminal of a power supply;
an idle module that turns off one or more active components of the power supply for an idle interval in response to the connection module determining that a load is not connected to the output;
a monitor module that turns on one or more active components of the power supply for a monitor interval in response to the end of an idle interval, wherein the connection module determines whether the load is connected to the output terminal of the power supply during the monitor interval; and
an activation module that turns on the one or more active components of the power supply in response to a determination by the connection module that the load is connected to the power supply during the monitor interval, wherein the power supply maintains a regulated voltage at the output terminal of the power supply.

2. The apparatus of claim 1, wherein the idle module further turns off one or more active components of the power supply for an idle interval in response to a determination by the connection module that the load is not connected to the power supply during the monitor interval.

3. The apparatus of claim 1, further comprising an internal power source for supplying power to at least one of the connection module, the monitor module, and the activation module during the idle interval.

4. The apparatus of claim 3, wherein the internal power source is a capacitor, and wherein the capacitor is charged in response to one of the power supply being in a supply mode state and the power supply being in a monitor interval of a power save mode state.

5. The apparatus of claim 4, wherein the capacitor size is related to the length of the idle interval such that the capacitor maintains sufficient energy to power at least one of the connection module, the monitor module, and the activation module during the idle interval.

6. The apparatus of claim 4, wherein the capacitor size is related to the length of the monitor interval such that the capacitor is charged with sufficient energy during the monitor interval to power at least one of the connection module, the monitor module, and the activation module during the idle interval.

7. The apparatus of claim 1, wherein the connection module determines whether the load is connected to the output of the power supply by measuring an output power value at the output terminal for the power supply and comparing the output power value with a pre-defined threshold value.

8. The apparatus of claim 7, wherein comparing the output power value with the pre-defined threshold value comprises a comparator receiving as input the output power value and a reference value defining the pre-defined threshold value as a low value approximately equal to a noise voltage.

9. The apparatus of claim 1, wherein the connection module determines whether the load is connected to the output of the power supply by measuring the current drawn through the output terminal of the power supply.

10. The apparatus of claim 7, wherein the connection module determining whether the load is connected to the output terminal of the power supply during the monitor interval comprises taking one of an instantaneous power measurement, an average power measurement over the monitor interval, and an average power measurement over one or more subintervals of the monitor interval.

11. The apparatus of claim 1, wherein the power supply is an Alternating Current (AC) to Direct Current (DC) adapter.

12. The apparatus of claim 1, wherein the one or more active circuit elements comprise one or more pulse width modulated switches.

13. An apparatus for reducing idle power in a power supply, the apparatus comprising:
a sensor module that measures the output power at the output terminal of the power supply and compares the output power to a pre-defined threshold value;
an idle module that turns off the power supply and deactivates sensing by the sensor module for an idle interval in response to the sensor module determining that the output power is less than the pre-defined threshold value;
a monitor module that turns on the power supply and activates sensing by the sensor module for a monitor interval in response to the end of the idle interval, wherein the sensor module measures the output power during the monitor interval;
a deactivation module that activates the idle module to turn off the power supply and sensing by the sensing module for an idle period in response to the sensor module measuring an output power less than the pre-defined threshold value during the monitor interval; and
F an activation module that returns the power supply to an active state in response to the sensor module measuring an output power greater than the pre-defined threshold value during the monitor interval, wherein the power supply in the active state provides a regulated voltage at the output terminal of the power supply.

14. The apparatus of claim 13, further comprising an internal power source for supplying power to the monitor module during the idle interval.

15. The apparatus of claim 14, wherein the internal power source is a capacitor, and wherein the capacitor is charged in response to the power supply being in an on state.

16. The apparatus of claim 15, wherein the capacitor size is related to the length of the idle interval such that the capacitor maintains sufficient energy to power the monitor module during the idle interval.

17. The apparatus of claim 15, wherein the capacitor size is related to the length of the monitor interval such that the capacitor is charged with sufficient energy during the monitor interval to power the monitor module during the idle interval.

18. The apparatus of claim 13, wherein the sensor module measures the average output power for the entire monitor interval and activates the idle module in response to determining that the average output power for the entire monitor interval is less than the pre-defined threshold value.

19. A method for reducing idle power in a power supply, the method comprising:
measuring the output power at the output terminal of the power supply and comparing the output power to a pre-defined threshold value;
turning off the power supply for an idle interval in response to measuring an output power that is less than the pre-defined threshold value;
turning on the power supply for a monitor interval and measuring the output power at the output terminal during the monitor interval, wherein turning on the power supply for monitoring occurs in response to the end of the idle interval; and
providing a regulated voltage at the output terminal of the power supply in response to measuring an output power greater than the pre-defined threshold value during the monitor interval.

20. The method of claim 19, further comprising repeating the steps of turning off the power supply for an idle interval and turning on the power supply for a monitor interval until an output power greater than the pre-defined threshold value is measured during the monitor interval.

21. The method of claim 19, wherein turning off the power supply comprises deactivating one or more active circuit elements of the power supply such that the power supply does not provide the regulated voltage at the output terminal that is provided when the power supply is in an on state, the one or more active circuit elements comprising one or more of MOSFETs, BJTs, pulse width modulators, power monitors, and comparators.

22. A computer program product comprising instructions stored in a computer readable medium for reducing idle power in a power supply, the computer program product comprising:
 a sensor module that determines whether a power supply is providing power to a load;
 an idle module that turns off the power supply and deactivates sensing by the sensor module for an idle interval in response to the sensor module determining that the power supply is not providing power to the load;
 a monitor module that turns on the power supply and activates sensing by the sensor module for a monitor interval in response to the end of an idle interval, wherein the sensor module determines whether the power supply is providing power to the load during the monitor interval;
 a deactivation module that activates the idle module to turn off the power supply and sensing by the sensing module for an idle period in response to the sensor module determining that the power supply is not providing power to the load during the monitor interval; and
 an activation module that returns the power supply to an active state in response to the sensor module determining that the power supply is providing power to the load during the monitor interval, wherein the power supply in the active state provides a regulated voltage at the output terminal of the power supply.

23. The computer program product of claim 22, wherein the modules are realized in a microcontroller.

24. The computer program product of claim 22, wherein the sensor module determines whether the power supply is providing power to the load by one of:
 measuring an output power value at the output terminal for the power supply and comparing the output power value with a pre-defined threshold value; and
 measuring the current drawn through the output terminal of the power supply.

25. The computer program product of claim 22, wherein the idle module turning off the power supply comprises the idle module providing a signal to turn off a pulse width modulator.

26. The computer program product of claim 22, wherein the microcontroller receives power from an internal power source, wherein the internal power source is one of a capacitor and a battery.

27. A system for reducing idle power in a power supply, the system comprising:
 a power supply that receives a regulated electrical input and generates a regulated electrical output, the power supply comprising:
  a sensor module that measures the output power at the output terminal of the power supply and compares the output power to a pre-defined threshold value;
  an idle module that turns off the power supply and deactivates sensing by the sensor module for an idle interval in response to the sensor module determining that the output power is less than the pre-defined threshold value;
  a monitor module that turns on the power supply and activates sensing by the sensor module for a monitor interval in response to the end of the idle interval, wherein the sensor module measures the output power during the monitor interval;
  a deactivation module that activates the idle module to turn off the power supply and sensing by the sensing module for an idle period in response to the sensor module measuring an output power less than the pre-defined threshold value during the monitor interval; and
  an activation module that returns the power supply to an active state in response to the sensor module measuring an output power greater than the pre-defined threshold value during the monitor interval, wherein the power supply in the active state provides a regulated voltage at the output terminal of the power supply.

28. The system of claim 27, further comprising an electronic device configured to connect to the output terminal of the power supply and to receive as input the output power of the power supply, wherein the power supply is one of an internal power supply and an external power adapter.

29. The system of claim 27, wherein the electronic device is one of a portable computer, an appliance, a phone, and a personal digital assistant ("PDA").

30. The system of claim 26, wherein the power supply is an inverter and the regulated voltage at the output terminals is an AC output and the regulated electrical input is a DC input.

* * * * *